Jan. 9, 1923.
W. E. WILLIAMS.
CONCAVE DISK WHEEL.
FILED MAR. 18, 1922.
1,441,770.
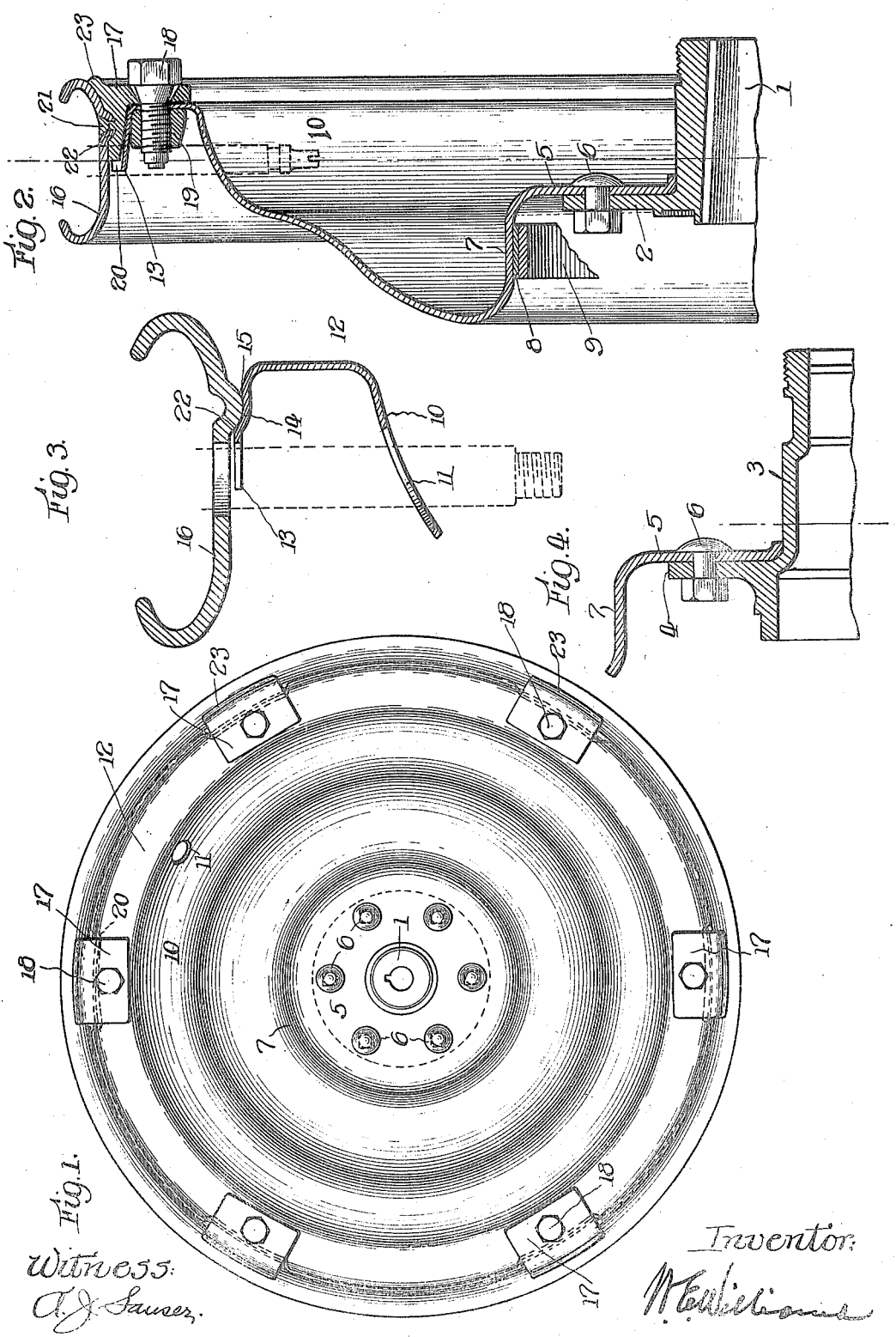

UNITED STATES PATENT OFFICE.

WILLIAM ERASTUS WILLIAMS, OF WILMETTE, ILLINOIS.

CONCAVE DISK WHEEL.

Application filed March 18, 1922. Serial No. 544,742.

*To all whom it may concern:*

Be it known that I, WILLIAM ERASTUS WILLIAMS, a citizen of the United States, a resident of Wilmette, in the county of Cook and State of Illinois, have invented a new and useful Improvement in Concave Disk Wheels, of which the following is a specification.

The object of my invention is to produce a very cheap disk wheel suitable for automobile purposes and so design the wheel that it will be concave in outline from the outside appearance, and furnish when needed a surface which may supplant the ordinary brake drum used with an automobile.

Reference will be had to the accompanying drawings in which Figure 1 is a front elevation of the wheel.

Figure 2 is a cross sectional elevation of half of the wheel.

Figure 3 is an enlarged detail through a section of the rim.

Figure 4 is a detail showing the front hub in section.

In the drawing 1 indicates the ordinary rear hub of an automobile of the common type. 2 indicates the integral flange of the hub. 3 indicates the front hub and 4 indicates the integral flange of the front hub. 5 indicates that portion of the disk or web of the wheel which is joined to the integral flanges 2 and 4 by the bolts 6. 7 indicates a horizontal cup shaped portion of the disk which occupies the space ordinarily occupied by the brake drum flange. 8 indicates the brake lining and 9 a section of the brake itself. From this brake drum portion 7 the disk is curved forward and outward into the zone indicated by 10, which is perforated where the valve stem goes through, as indicated by the perforation 11. Outwardly from the perforation, the disk has a portion 12 simulating a felloe, merging in an inwardly bent flange 13 having a peripheral annular depression 14 to receive a rib 15 of a rim 16, here shown as demountable and provided with a series of lugs 17, preferably secured to the rim by rivets 21. Through these lugs, respectively, pass bolts 18 engaging nuts 19 fixed to the inner face of the disk. The flange 13 is pressed radially inward at the proper points to form seats 20 for the lugs 17. The function of the lugs 17 is simply to hold the rim upon the disk flange 13, and hence the construction shown, which indicates a desirable form, is not necessarily invariable.

What I claim is:—

1. In a wheel of the class described, a disk offset from its primary plane to form a brake drum surface and further offset to form around said surface a concave zone, said zone being marginally adapted for attachment to a rim.

2. In a wheel of the class described, a dished disk having a section adapted to serve as a brake drum and curved outward to a union with the rim of the wheel.

3. In a wheel of the class described, a disk forming the web of the wheel curved to furnish a brake contact surface and having a face simulating a front face of a felloe and with a perforation extending in line with the central load line, adapted to receive the air inflating valve of a pneumatic tire.

4. In a wheel of the class described, the combination with a hub and a rim, of an intermediate disk secured to the hub, bent laterally to form a cylindrical brake surface and further offset in the same direction to form a curved zone extending toward the rim, and clips securing the margin of the disk to the rim.

Signed at Chicago, in the county of Cook and State of Illinois, this 8th day of March, 1922.

WILLIAM ERASTUS WILLIAMS.

Witnesses:
  B. J. BERNHARD,
  Jos. E. LOVE.